United States Patent
Evans et al.

(10) Patent No.: US 7,494,165 B2
(45) Date of Patent: *Feb. 24, 2009

(54) METHOD OF MAKING BUMPER SYSTEM USING THERMOFORMED COMPONENT

(75) Inventors: Darin Evans, Wixom, MI (US); Mel Guiles, West Olive, MI (US)

(73) Assignee: NetShape Energy Management LLC, Grand Haven, MI (US)

( * ) Notice: Subject to any disclaimer, the term of this patent is extended or adjusted under 35 U.S.C. 154(b) by 292 days.

This patent is subject to a terminal disclaimer.

(21) Appl. No.: 10/562,099

(22) PCT Filed: Dec. 15, 2003

(86) PCT No.: PCT/US03/39803

§ 371 (c)(1),
(2), (4) Date: Dec. 21, 2005

(87) PCT Pub. No.: WO2005/012043

PCT Pub. Date: Feb. 10, 2005

(65) Prior Publication Data

US 2007/0108778 A1    May 17, 2007

Related U.S. Application Data

(60) Provisional application No. 60/484,712, filed on Jul. 3, 2003.

(51) Int. Cl.
*B60R 19/03* (2006.01)
(52) U.S. Cl. .................. 293/102; 293/121; 29/897.2
(58) Field of Classification Search ................ 293/110, 293/120, 121, 122, 132, 133, 102; 29/897.2
See application file for complete search history.

(56) References Cited

U.S. PATENT DOCUMENTS

| 3,231,454 A | 1/1966 | Williams |
| 3,577,305 A | 5/1971 | Hines et al. |
| 3,695,665 A | 10/1972 | Matsuura |
| 3,746,605 A | 7/1973 | Dillon et al. |
| 3,747,968 A | 7/1973 | Hornsby |
| 3,768,850 A | 10/1973 | Barton et al. |
| 3,782,767 A | 1/1974 | Moore |
| 3,782,768 A | 1/1974 | Moore |

(Continued)

FOREIGN PATENT DOCUMENTS

WO    WO 96/06288    2/1996

*Primary Examiner*—Jason S Morrow
(74) *Attorney, Agent, or Firm*—Price, Heneveld, Cooper, DeWitt & Litton LLP

(57) ABSTRACT

A bumper system includes a tubular beam (21) and a thermoformed energy absorber with crush boxes (23) formed into a base flange, such as by vacuum or thermal forming processes. The crush boxes have planar energy-absorbing sidewalls a depth of about 10 mm to 35 mm, wall thickness of about 1 mm to 3 mm, and are formed from polyethylene or other thermoform materials having a memory. The base flange can include thermoformed features engaging recesses in the beam, and is combinable with injection-molded or foam energy absorbers for design flexibility. In one form, the energy absorber includes a thermoformed first sheet forming crush boxes and a second sheet bonded to the first sheet to define apertured air pockets. Related methods of manufacture and impacting are also disclosed.

20 Claims, 15 Drawing Sheets

U.S. PATENT DOCUMENTS

| | | |
|---|---|---|
| 3,810,668 A | 5/1974 | Kornhauser |
| 3,837,991 A | 9/1974 | Evans |
| 3,885,074 A | 5/1975 | Chandler |
| 3,900,222 A | 8/1975 | Muller |
| 3,900,356 A | 8/1975 | Koch et al. |
| 3,902,748 A | 9/1975 | Bank et al. |
| 3,938,841 A | 2/1976 | Glance et al. |
| 3,971,583 A | 7/1976 | Kornhauser |
| 4,050,689 A | 9/1977 | Barton et al. |
| 4,061,385 A | 12/1977 | Schwartzberg |
| 4,070,052 A | 1/1978 | Ng |
| 4,076,872 A | 2/1978 | Lewicki et al. |
| 4,096,306 A | 6/1978 | Larson |
| 4,287,250 A | 9/1981 | Rudy |
| 4,314,865 A | 2/1982 | Ottaviano |
| 4,344,536 A | 8/1982 | Oberhuber |
| 4,427,474 A | 1/1984 | Ottaviano |
| 4,533,583 A | 8/1985 | May |
| 4,551,379 A | 11/1985 | Kerr |
| 4,597,601 A | 7/1986 | Manning |
| 4,631,221 A | 12/1986 | Disselbeck |
| 4,890,877 A | 1/1990 | Ashtiani-Zarandi et al. |
| 4,995,659 A | 2/1991 | Park |
| 5,030,501 A | 7/1991 | Colvin et al. |
| 5,042,859 A | 8/1991 | Zhang et al. |
| 5,098,124 A | 3/1992 | Breed et al. |
| 5,106,137 A | 4/1992 | Curtis |
| 5,141,279 A | 8/1992 | Weller |
| 5,152,023 A | 10/1992 | Graebe |
| 5,243,722 A | 9/1993 | Gusakov |
| 5,356,177 A | 10/1994 | Weller |
| 5,431,463 A | 7/1995 | Chou |
| 5,564,535 A | 10/1996 | Kanianthra |
| 5,596,781 A | 1/1997 | Graebe |
| 5,651,569 A | 7/1997 | Molnar |
| 5,851,626 A | 12/1998 | McCorry et al. |
| 6,017,084 A | 1/2000 | Carroll, III |
| 6,199,942 B1 | 3/2001 | Carroll, III |
| 6,234,526 B1 | 5/2001 | Song et al. |
| 6,247,745 B1 | 6/2001 | Carroll, III et al. |
| 6,315,339 B1 | 11/2001 | Devilliers et al. |
| 6,375,251 B1 | 4/2002 | Taghaddos |
| 6,406,079 B2 | 6/2002 | Tamada et al. |
| 6,406,081 B1 | 6/2002 | Mahfet et al. |
| 6,435,579 B1 | 8/2002 | Glance |
| 6,443,513 B1 | 9/2002 | Glance |
| 6,609,740 B2 | 8/2003 | Evans |
| 6,644,701 B2 | 11/2003 | Weissenborn et al. |
| 6,679,967 B1 | 1/2004 | Carroll, III |
| 6,681,907 B2 | 1/2004 | Le |
| 6,682,128 B2 | 1/2004 | Carroll, III et al. |
| 6,726,262 B2 | 4/2004 | Marijnissen et al. |
| 7,278,667 B2 * | 10/2007 | Mohapatra et al. .......... 293/132 |
| 2002/0005644 A1 | 1/2002 | Tamada et al. |
| 2002/0017805 A1 | 2/2002 | Carroll, III et al. |
| 2002/0060462 A1 | 5/2002 | Glance |
| 2002/0070584 A1 | 6/2002 | Carroll, III |
| 2002/0149213 A1 | 10/2002 | Weissenborn |
| 2002/0149214 A1 | 10/2002 | Evans |
| 2003/0047952 A1 | 3/2003 | Trappe |
| 2004/0066048 A1 * | 4/2004 | Mooijman et al. .......... 293/120 |
| 2006/0043743 A1 * | 3/2006 | Shuler et al. ................ 293/120 |
| 2007/0278803 A1 * | 12/2007 | Jaarda et al. ................ 293/120 |

* cited by examiner

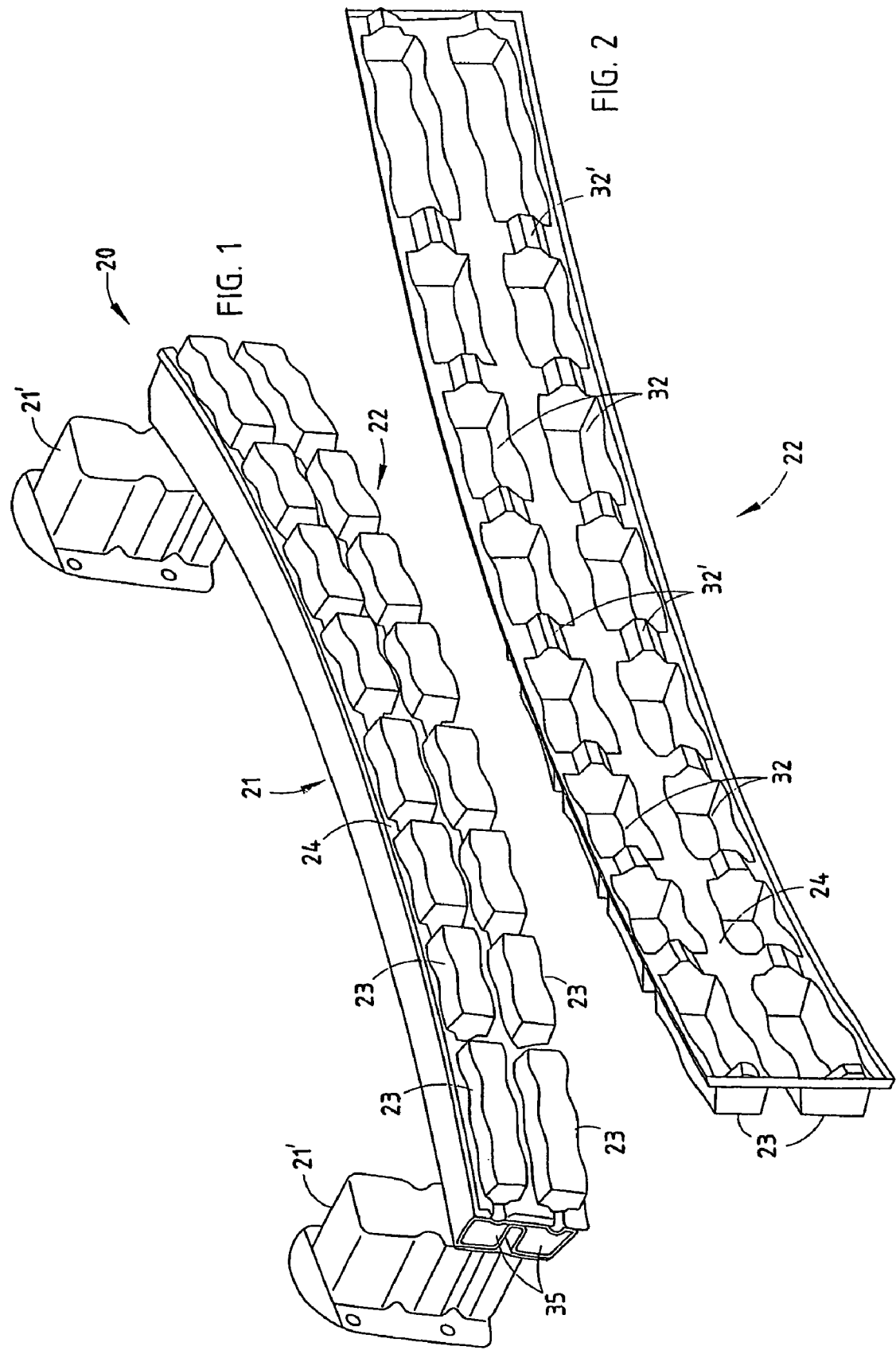

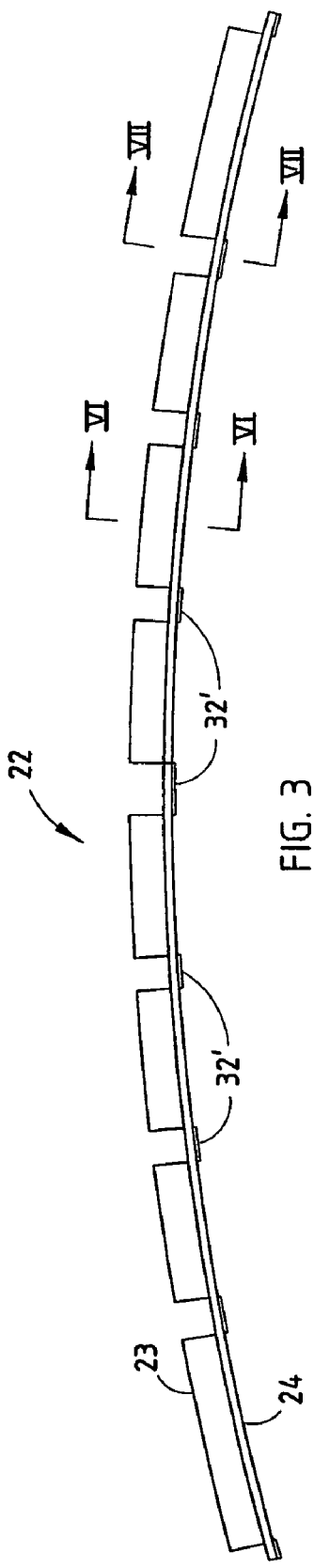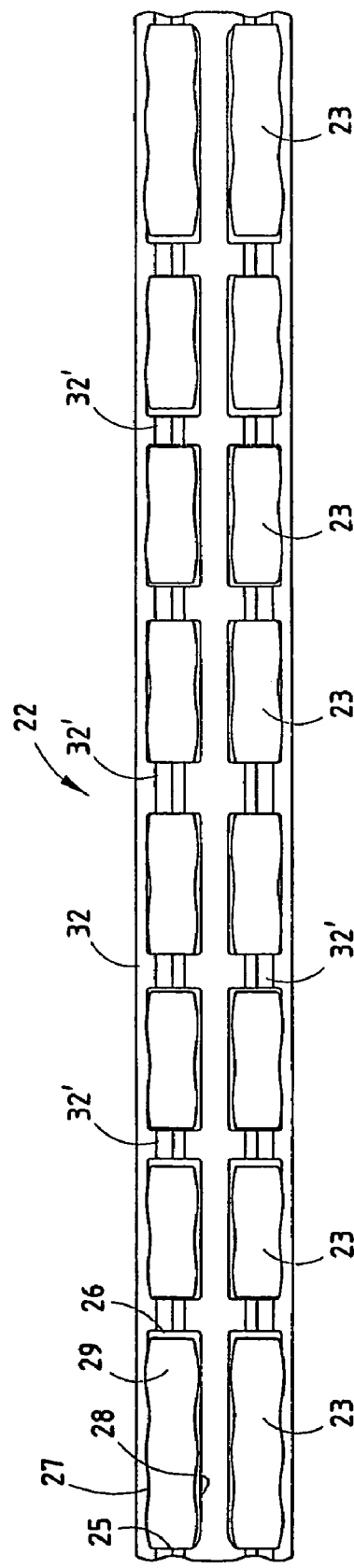

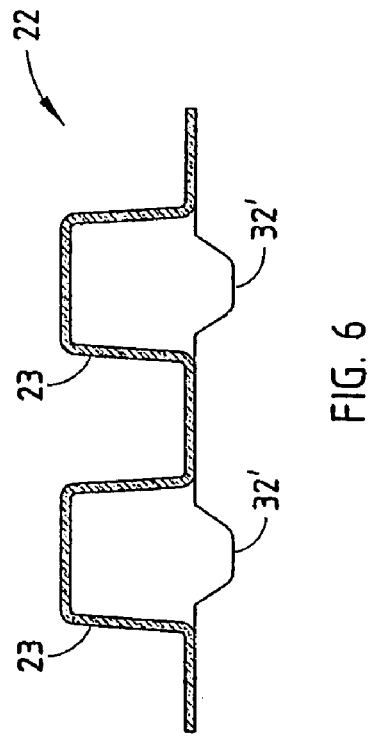
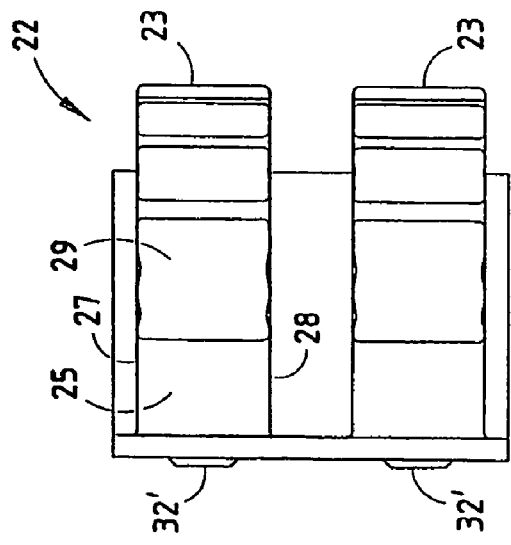
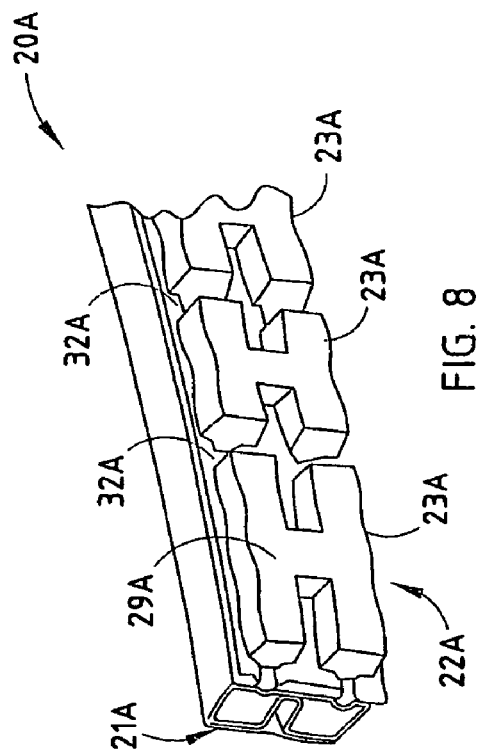
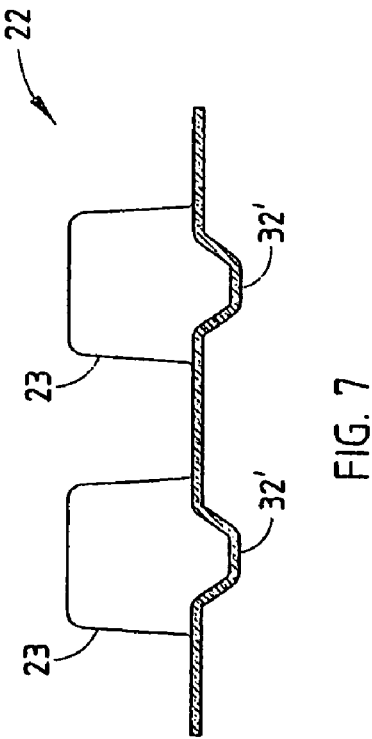
FIG. 5
FIG. 6
FIG. 7
FIG. 8

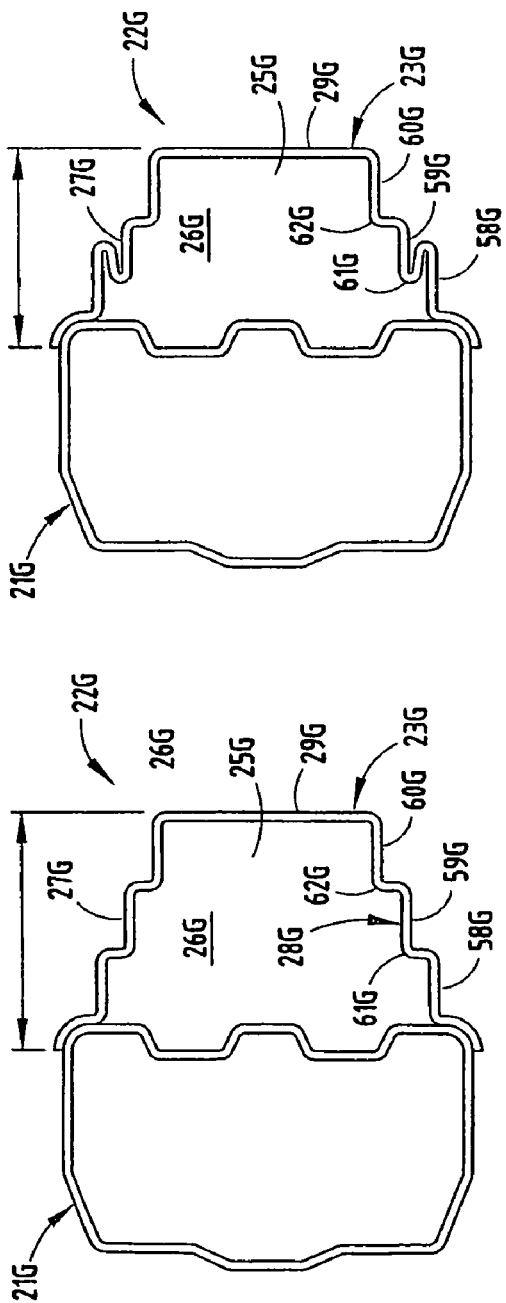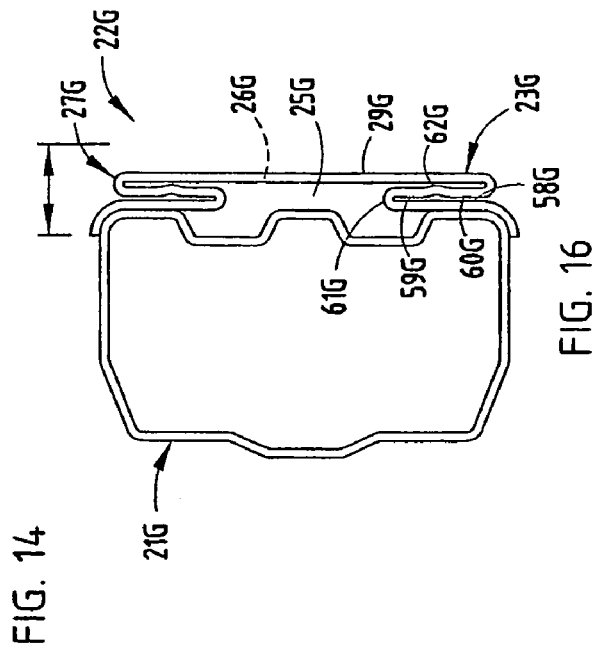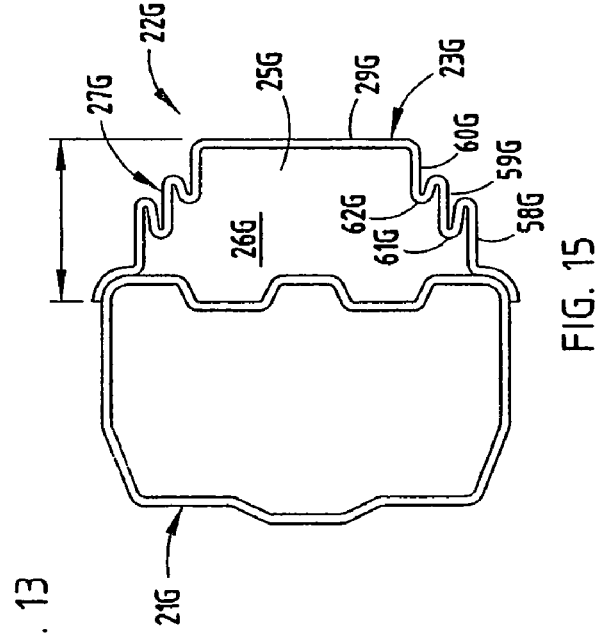

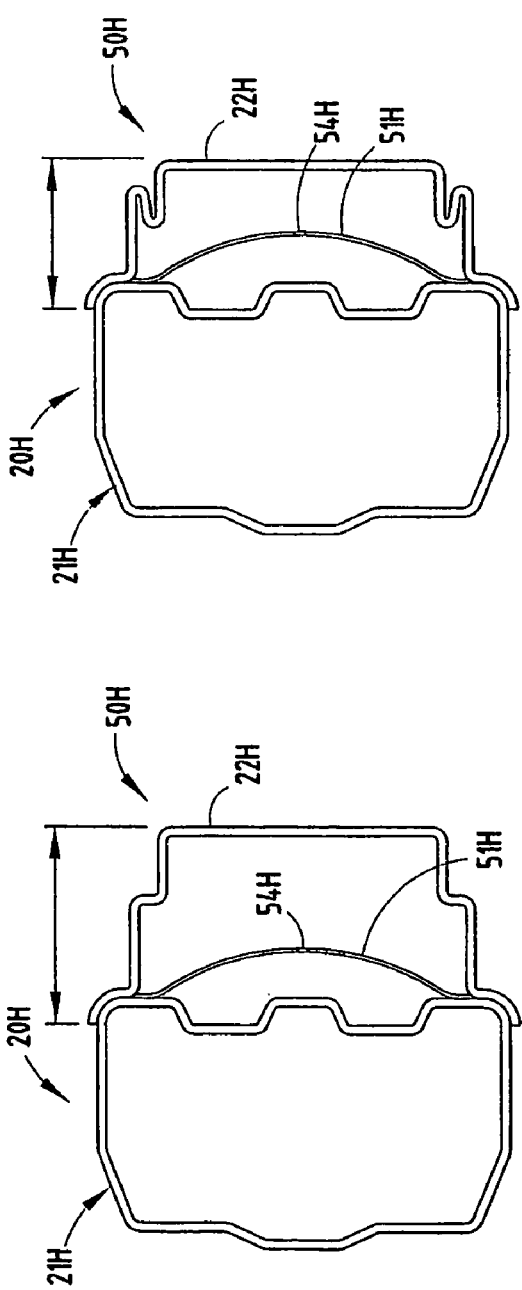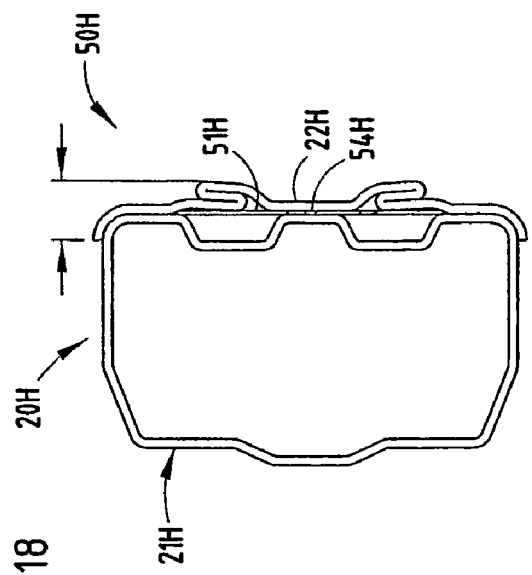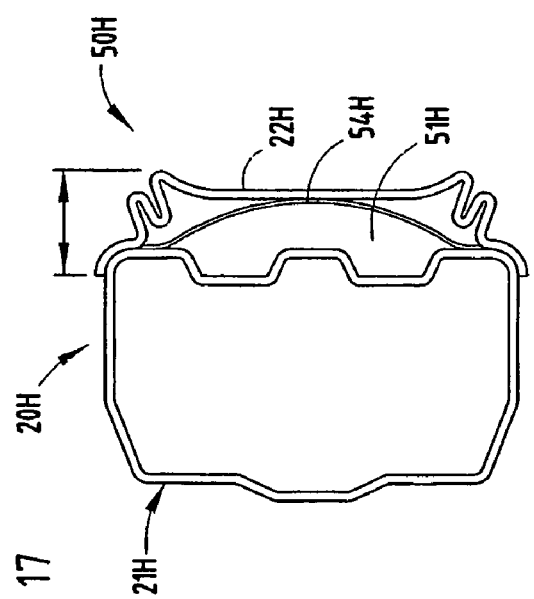

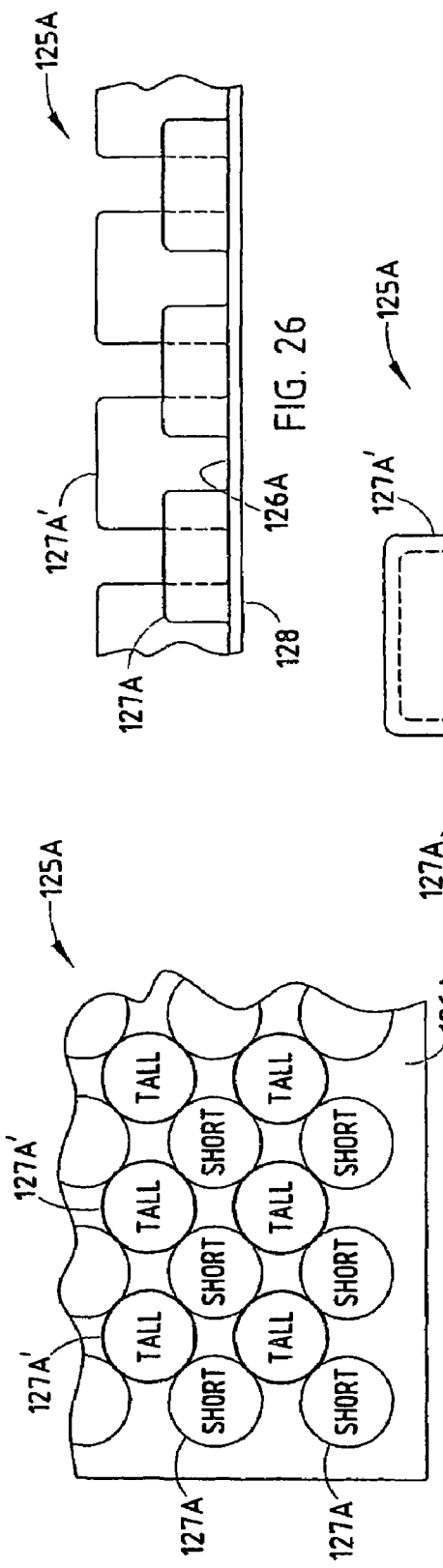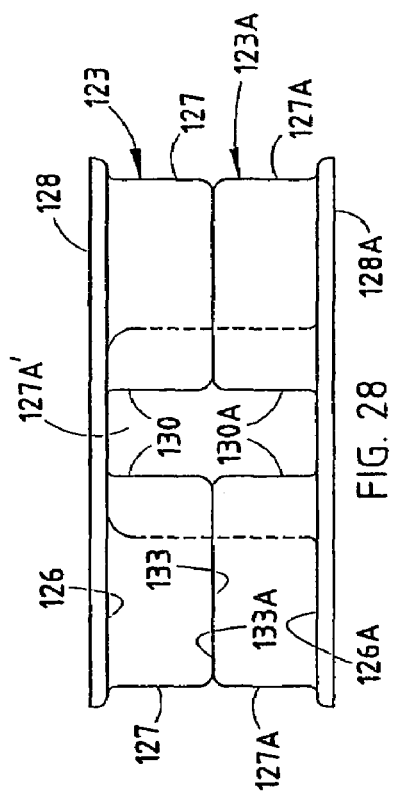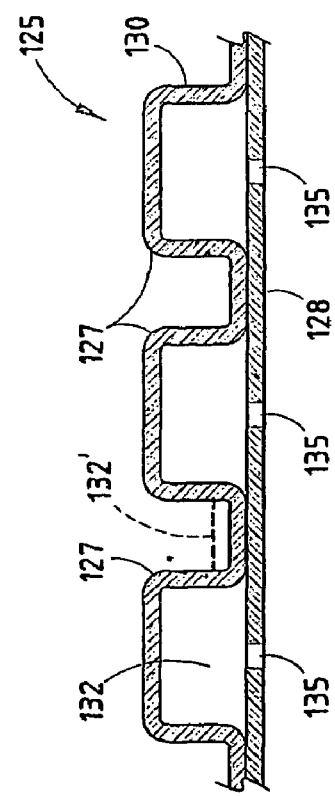

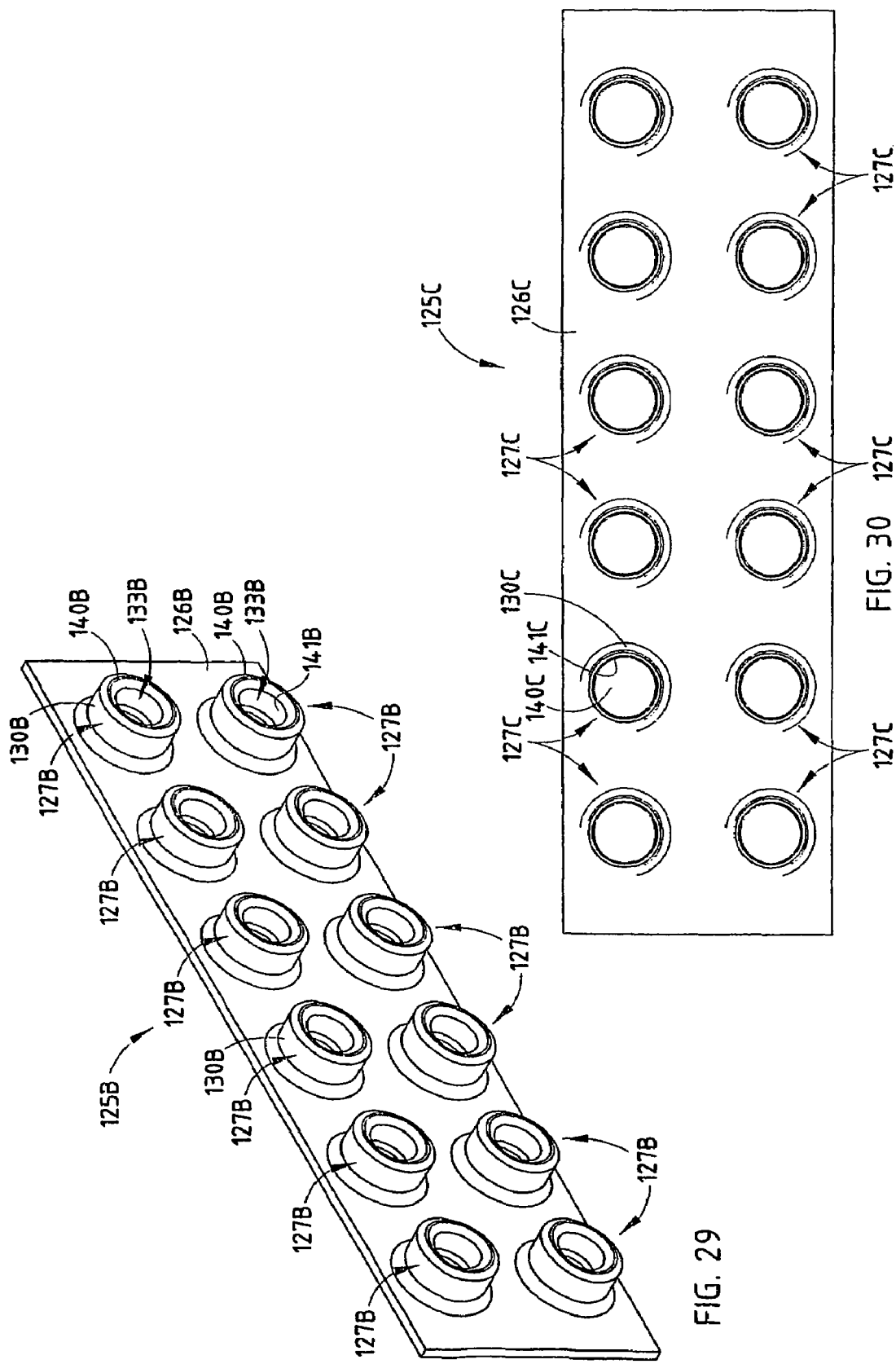

METHOD OF MAKING BUMPER SYSTEM USING THERMOFORMED COMPONENT

This application is the national stage application of international application PCT/US03/39803 filed Dec. 15, 2003 which claims the benefit of provisional application 60/484,712 filed on Jul. 3, 2003.

BACKGROUND OF THE INVENTION

The present invention relates to energy absorbing systems for absorbing energy in and around vehicles, and in particular relates to energy absorbing systems for passenger vehicles incorporating a thermoformed energy absorber.

Modern energy absorbing systems are designed to absorb a maximum of impact energy over a given stroke. At the same time, they are designed to minimize load spikes, and to distribute energy in a manner promoting uniform and predictable collapse upon undergoing a vehicle crash. Every centimeter of space is important to energy absorption, even spaces of 10 mm or less. Further, the individual components of an energy absorbing system must combine well with other energy absorbing components, e.g. metal tubular beams and non-tubular channels, injection-molded "honeycomb" energy absorbers, foam "block" energy absorbers, hydraulic shock absorbers, crush towers and mounts, and various combinations thereof. At the same time, light weight must be maintained. Also, it is desirable to maintain an ability to customize energy absorption at selected impact zones (e.g. at a corner of the vehicle or at a center impact, such as with a post impact). Concurrently, all components of a bumper system must be flexible, and able to conform to an aerodynamic sweeping curvature of a vehicle front.

Notably, thermoformed parts have not been used much on bumper systems for modern passenger vehicles, since it is generally accepted in the bumper industry that energy absorbers must be relatively deep parts (such as about 40 mm or more deep) and include significant wall thickness (e.g. 3 mm or greater wall thickness) in order to provide a good crush stroke and energy absorption during impact. Further, most injection-molded energy absorbers made of solid polymer are relatively complex parts with undulating surfaces, varied wall thicknesses, and different wall spacings to provide optimal energy absorption in different regions of the energy absorbers. This is directly in opposition to thermoformed parts, which are basically limited to relatively short depths, relatively constant and relatively thin wall thicknesses (or at least reduced wall thicknesses in stretched areas), and no undercut/blind surfaces. Thus, for years, original equipment manufacturers of passenger vehicles have avoided using thermoformed parts, despite the fact that thermoformed molds generally cost less, require shorter lead times, provide faster cycle times, have lower thermal energy use, generate less waste, and are more environment friendly processes. Skilled artisans in bumper design have apparently not fully realized the unexpected added benefits that thermoformed parts can offer when combined with other energy absorbing systems and components.

Accordingly, a bumper system is desired having the aforementioned advantages and solving the aforementioned problems.

SUMMARY OF THE INVENTION

In one aspect of the present invention, an energy absorbing system for absorbing impact energy in a vehicle collision includes an elongated structural beam with a relatively flat face, and a thermoformed energy absorber supported on the face, the energy absorber being formed from a single sheet of material by a thermoforming process to have a base flange and a plurality of thermoformed longitudinally-elongated crush boxes that extend generally perpendicularly from the base flange in a fore/aft direction parallel a direction of expected impact. The crush boxes each have opposing side walls and orthogonally-related end walls and a side-wall-supported front wall with the crush boxes each being spaced apart from each other along the base flange. The crush boxes each define a separate rearwardly-facing opening, and the side walls, end walls, and front walls are continuous. The energy absorber defines a forward-facing surface and a rearward-facing surface, each being open and unobstructed in a linear direction parallel the fore/aft direction and not having undercut surfaces, whereby the energy absorber can be thermoformed from the sheet of material by passing a portion of mold tooling in a forming direction parallel the fore/aft direction through the base flange linearly into the rearwardly-facing openings defined by the crush boxes. The opposing side walls are stretched during the thermoforming process and have a thickness dimension less than a thickness of the front walls and of the base flange due to the thermoforming process.

In another aspect of the present invention, a system includes a beam having a face and at least one elongated recess formed in the face, and a thermoformed energy absorber formed from a sheet of polymeric material and having a base flange and crush boxes formed in the energy absorber in a direction perpendicular to the base flange and further having at least one thermoformed ridge extending from the base flange into engagement with the recess to retain the energy absorber on the face during a vehicle crash.

In another aspect of the present invention, a system includes a metal beam having a face. A first polymeric energy absorber has energy-absorbing blocks selected from one or both of hollow crush boxes and foam blocks. A thermoformed second polymeric energy absorber covers a substantial portion of a front of the first polymeric energy absorber, the second polymeric energy absorber including a base flange engaging the first polymeric energy absorber and including at least one crush box formed therein.

In yet another aspect of the present invention, an energy absorbing system includes a beam having a face, an energy absorber abutting the face including a thermoformed component, and a cover covering the beam and the energy absorber. The thermoformed component has a base sheet adjacent the face and a plurality of crush boxes extending forwardly from the base sheet into engagement with the fascia. The crush boxes each have opposing side walls and a front wall that define orthogonally-related planes, and also has top and bottom walls that are undulating in a longitudinal direction with alternating convex and concave regions. The crush boxes are open on at least one side to facilitate thermoforming the thermoformed component, the crush boxes defining shapes selected from a group of shapes where at least one of the side walls defines a concavity.

In still another aspect of the present invention, an energy absorbing system includes a beam having a face, an energy absorber abutting the face including a thermoformed component, and a cover covering the beam and the energy absorber. The thermoformed component has a base sheet adjacent the face and a plurality of crush boxes extending forwardly from the base sheet into engagement with the fascia; the crush boxes each having opposing side and front walls that define orthogonally-related planes, and also having top and bottom walls that are undulating in a longitudinal direction with alternating convex and concave regions. The crush boxes are open on at least one side to facilitate thermoforming the thermoformed component.

These and other features, objects, and advantages of the present invention will become apparent to a person of ordinary skill upon reading the following description and claims together with reference to the accompanying drawings.

BRIEF DESCRIPTION OF DRAWINGS

FIG. 1 is a perspective view of a bumper system incorporating a pair of mounts, a tubular beam, and a thermoformed energy absorber;

FIGS. 2-5 are perspective, top, front, and end views of the thermoformed energy absorber of FIG. 1;

FIGS. 6-7 are cross-sections taken along the lines VI-VI and VII-VII in FIG. 3;

FIG. 8 is a partial perspective view of a first modified bumper system similar to FIG. 1;

FIG. 13 is a cross-sectional view of a fifth modified energy absorber similar to FIG. 1, but having a sidewall with a three-tier stepped construction;

FIGS. 14-16 are cross-sections similar to FIG. 13, showing a crush sequence upon impact of the energy absorber of FIG. 13;

FIGS. 17-20 are cross-sections of a sixth modified energy absorber similar to FIG. 11, the FIGS. 18-20 showing a crush sequence upon impact of the energy absorber of FIG. 17.

FIGS. 25-26 are plan and side views of a modified energy absorber, and FIG. 26A is an enlarged sectional view of a portion of FIG. 26;

FIG. 27 is a second modified energy absorber;

FIG. 28 is an enlarged fragmentary sectional view of the energy absorber of FIG. 23;

FIG. 29 is a perspective view of another modified energy absorber, including a pattern of thermoformed crush boxes;

FIGS. 30-37 are views of additional modified thermoformed energy absorbers, FIGS. 30-32 and 36-37 being plan views, and FIGS. 33-35 being side cross-sectional side views;

DETAILED DESCRIPTION OF THE PREFERRED EMBODIMENTS

Figure 9:
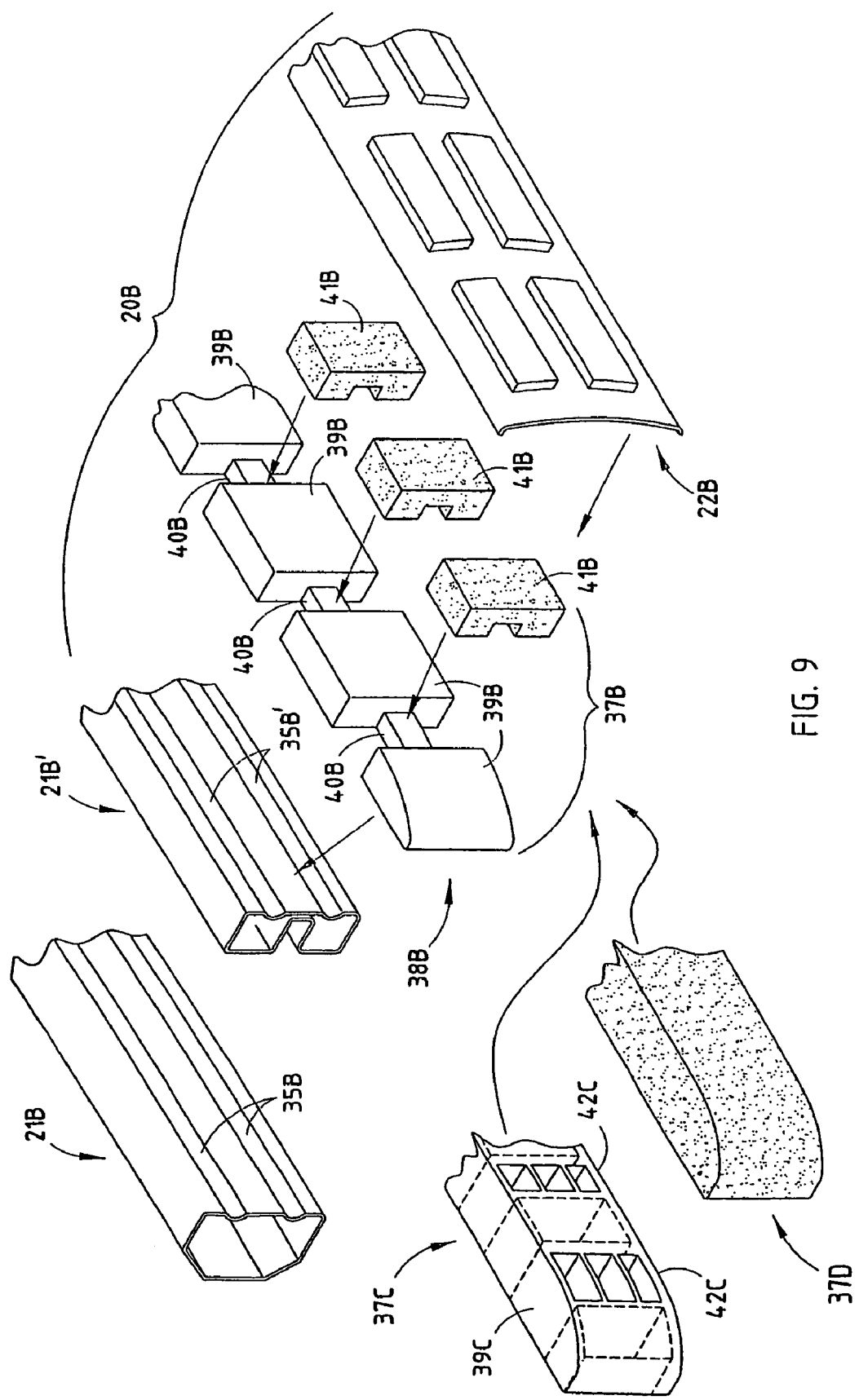
FIG. 9 is an exploded perspective view of second modified bumper system, similar to FIG. 1, but showing alternative intermediate energy absorbers between the beam and thermoformed energy absorber of FIG. 1.

A bumper system 20 (FIG. 1) includes a B-shaped roll-formed and swept tubular beam 21 with mounts 21' adapted for attachment to front rails of a vehicle frame, and a thermoformed energy absorber 22. The energy absorber 22 has a base flange 24, and a plurality of thermoformed crush boxes 23 thermally deformed from the material of the base flange 24, such as by vacuum forming processes. The crush boxes 23 each have planar energy-absorbing sidewalls 25-28 (FIG. 4) and a face wall 29 to form a box shape with the base-flange-side of the box shape being open. The crush boxes 23 have a thickness (i.e. height) of anywhere from about 10 mm to 60 mm, and more preferably a height of about 20 mm to 30 mm, depending on a space in front of the beam 21 as it sweeps around a front of the vehicle. The vacuum formed energy absorber has a shape chosen to support fascia on the beam 21. It is contemplated that differently shaped energy absorbers 22 can be mated with the same beam 21 to provide fascia support on different vehicle models. Given the low cost of tooling for thermoformed parts, and the high cost for tooling for beams 21 and other injection-molded energy absorbers, this is a tremendous advantage.

The walls 25-29 of the crush boxes 23 can have wall thicknesses of any thickness, such as about 1 mm to 3 mm, but preferably have a wall thickness of about 2.0 mm or less, or more preferably a wall thickness of about 1.5 mm or less, and potentially have a wall thickness of about 1.0 mm or less. In particular, the thickness of the walls that are stretched during the thermoform vacuum-assisted process can be reduced significantly, especially at sharp radii. Notably, the depth and wall thicknesses are somewhat enlarged in the views of FIGS. 1-7 to better illustrate the present invention.

The thermoformed energy absorber 22 can be formed from any thermoformable material, but is preferably formed from polyethylene polymer, such as high density polyethylene ("HDPE"), which has memory and will recover and flex back toward an original thermoformed shape after being crushed during a vehicle impact. It is also conceived that a shape similar to the illustrated energy absorber 22 can be injection-molded, although the cost of tooling for such may be significantly more expensive than for a thermoformed part. The base flange 24 has thermoformed features 32' (FIG. 2) engaging one of the two longitudinal channels or recesses 35 in a face of the beam 21, thus helping retain the energy absorber 22 on the beam 21. By changing material thickness, material type, corner radius, and other factors, the energy absorber 22 can be turned to provide optimal energy absorption for the system.

The bumper beam 21 can be a variety of different shapes and profiles. The illustrated beam 21 is "B" shaped, but it is conceived that it could be "D" shaped, "C" shaped, or other shapes. The illustrated beam is rollformed and tubular, which is a preferred mode based on its strength and relatively lower cost.

The energy absorber 22 (FIGS. 3-4) includes upper and lower horizontal rows of crush boxes 23. The upper and lower crush boxes 23 are vertically about equal in height, and are about equal to the respective top and bottom tubular sections of the "B" beam 21, which they are positioned in front of. Thus the top and bottom walls 27-28, which extend horizontally, are generally aligned or slightly inboard with the horizontal top and bottom walls of the respective tubular section of the "B" beam 21 behind them. Further, the walls 27-28 (and potentially also the walls 25-26) are wavy or undulated for increased strength and stability.

The crush boxes 23 can be varied in length, height, and size to optimize crush strength in selected regions of the bumper system. For example, the illustrated crush boxes 23 near the ends of beam 21 in FIGS. 3-4 are longer than the intermediate positioned crush boxes 23. Also, the illustrated crush boxes 23 can be spaced-apart equal or unequal amounts. The crush boxes 23 are each spaced apart by an interconnecting strap 32. The illustrated straps 32 include two U-shaped recessed or bowed features 32' (FIG. 4) that extend rearward of the base flange 22, and that are adapted to fit matably into respective recessed channels 35 (FIG. 1) in the face wall 29 of the beam 21 in a manner that helps accurately and stably locate the energy absorber 22 on the beam 21. Specifically, the features 32' help prevent the energy absorber 22 from slipping undesirably up or down during an impact. It is conceived that the straps 32 can include other features to engage and locate on the beam 21, such as hooks or bulbous detents. The channels 35 extend longitudinally across the face wall 29 of the beam 21, and are positioned generally in front of the respective top and bottom tubular sections on the beam 21. It is preferable that the walls 25-29 be kept relatively planar and flat and that the crush boxes 23 have parallel walls or be pyramid or trapezoidal in shape, but it is noted that there win be some distortion of the walls due to natural thermoforming properties. Also, the walls must have some draft angle, such as 1° to 2°, to facilitate the thermoforming process. It is further noted that the walls 25-29 are joined to each other and to base flange 24 by small radii, which is a necessary and industry-wide practice in the thermoforming industry to prevent tearing and to facilitate stretching of material during the thermoforming process. Typical radii are at least about equal to a thickness of the material. However, it is widely accepted in the industry to provide larger radii as needed to prevent walls from becoming too thin in high stretch areas.

Additional modified bumper systems and energy absorbers are shown in FIGS. 8-20. In these additional systems and components, many of the identical or similar components, parts, and features are labeled using the same identification number but with addition of a letter "A", "B", "C" or etc. This is done to reduce unnecessary and redundant discussion. However, it is noted that sometimes two similar thermoformed sheets are bonded together, such that different numbers are used to avoid confusing the two sheets. (For example, see FIGS. 11 and 38.)

Bumper system 20A (FIG. 8) includes a "B" beam 21A and a thermoformed energy absorber 22A on its face. In energy absorber 22A, the crush boxes 23A have an "I" shape or sideways "H" shape in front view. This gives the individual crush boxes 23A added strength and stability. It is contemplated that the crush boxes 23A can be other shapes as well, such as "T" or "X" or "C" or "O" or "N" shapes. Notably, the face or front wall 29A of the energy absorber 22A is generally flat, but may be contoured vertically and horizontally to match a profile of the fascia, such as being tapered near ends of the beam 21A. Also, the straps 32A provide some longitudinal flexibility to the energy absorber 22A. By this arrangement, the face wall 29A better matches the aerodynamic curvilinear shape commonly found on modern passenger vehicles.

The bumper system 20B (FIG. 9) includes a B-shaped beam 21B (or a D-shaped beam 21B'), a thermoformed energy absorber 22B, and a second intermediate energy absorber in the form of one of the energy absorbers 37B, 37C, or 37D. The energy absorbers 37B, 37C, or 37D are interchangeable, and illustrate an advantage of the present thermoformed energy absorber 22B. Each energy absorber 37B, C, D includes a ridge shaped to fit into a channel-shaped recess 35B (or 35B') on the beam 21B (or 21B'). The energy absorber 37B includes a one-piece injection-molded component 38B made of an injection-moldable material such as XENOY (made by GE Company) forming box-like energy-absorbing blocks 39B and interconnecting U-shaped straps 40B, and further includes a plurality of energy-absorbing foam blocks 41B positioned between the blocks 39B. The box-like blocks 39B are hollow and include open rear sides so that they can be made by a single simple injection molding process. The foam blocks 41B fit snugly between the box-like blocks 39B. The thermoformed energy absorber 22B forms a cap closing a face of the intermediate energy absorber 37B. The energy absorber 37C is a complete one-piece, injection-molded component, and includes rearwardly-open box-like blocks 39C and further includes forwardly-open areas 42C interconnecting the box-like blocks 39C. The intermediate energy absorber 37D is made entirely from foam and is adapted to replace the energy absorber 37C. Alternatively, the foam energy absorber can be made to abut a face of the injection molded energy absorber 37C. As can be seen, a variety of different intermediate energy absorbing components and hybrids can be positioned between or with the beam 21B and the thermoformed energy absorber 22B.

Figure 10:
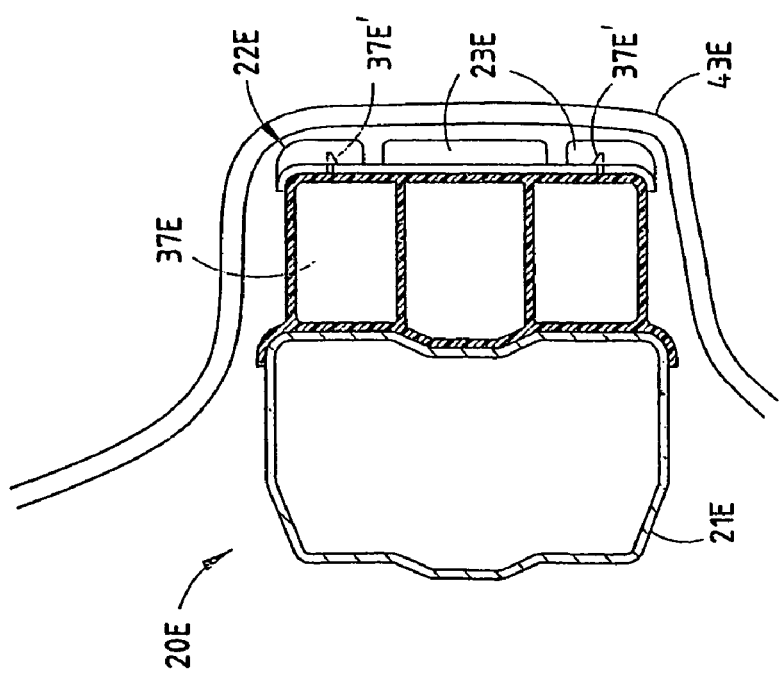
FIG. 10 is a cross-sectional view of FIG. 9.

FIG. 10 illustrates a bumper system 20E that incorporates a D-shaped beam 21E, an injection-molded intermediate energy absorber 37E, and a thermoformed energy absorber 22E, with a TPO front fascia 43E positioned thereon. Advantageously, different thermoformed energy absorbers (22E) with crush boxes (23E) can be used with the beam 21E and primary energy absorber 37E, allowing the same beam 21E and energy absorber 37E to be used on different vehicle models having differently shaped fascia (43E).

Specifically, it is potentially a tremendous advantage to use a common injection-molded part and/or beam on different vehicle platforms or models. The thermoformed energy absorber 22E is used to fill varying sized gaps along the different fascia to address different styling surfaces. The thermoformed energy absorber is particularly advantageous to fill this need, since the tooling is relatively low-cost and can be made relatively quickly, and further the thermoformed energy absorber itself can have a much lower cost and weight, depending on the design and other criteria. It is contemplated that the thermoformed energy absorber 22E can be held in place on a face of the intermediate energy absorber 37E by the front fascia 43E. Alternatively, it is contemplated that various attachment mechanisms can be used to attach the thermoformed energy absorber 22E to the injection-molded intermediate energy absorber 37E, such as by placing hooks 37E' on the intermediate energy absorber 37E that engage apertures or surface features on the thermoformed energy absorber 22E, and/or other male and female connections such as detents and frictional engagement on nesting surfaces, heat staked attachment arrangements, bonding arrangements, and other attachment systems. It is noted that the bumper system 20E of FIG. 10 is very environmentally friendly and uses recyclable components, and in particular does not include either a thermoset material or a foam material that is difficult to recycle. Further, the thermoformed energy absorber can be easily separated from other materials, making it even easier to recycle.

Figure 11A:
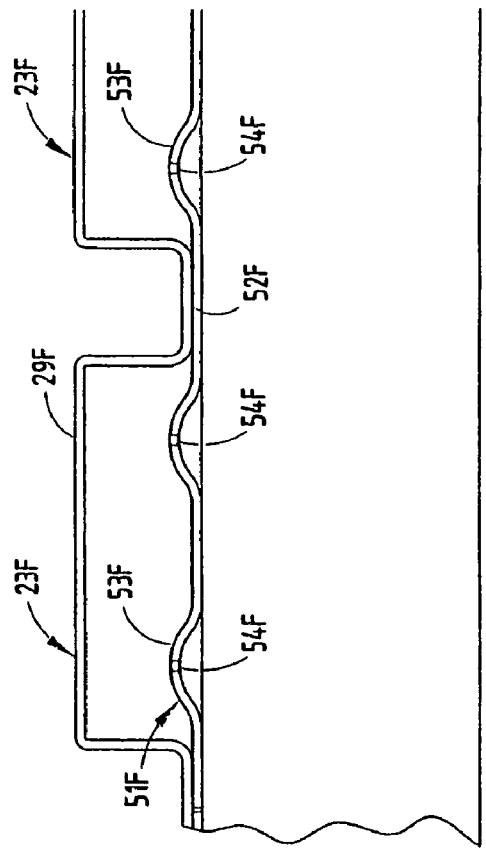
FIG. 11A is a cross-sectional view taken along the line XIA-XIA in FIG. 11.

Bumper system 20F (FIGS. 11-11A) includes a D-shaped beam 21F and an energy absorber 50F on its face surface. The energy absorber 50F (FIGS. 11-12) includes a thermoformed sheet 22F and further includes a second sheet 51F coupled to the thermoformed sheet 22F to form air-trapped cavities under the crush boxes 23F. The two sheets 22F and 51F are brought together while hot and compressed at local points to meld and/or bond together to form an airtight seam. In particular, the sheet 51F has a base flange 52F and several bulbous pillow-shaped regions 53F that extend partially into the crush boxes 23F of the sheet 22F. One or more small vent holes 54F are formed in each of the pillow-shaped regions 53F. The sheet 51F can have a thickness similar to the sheet 22F, or can be substantially thinner, such as 0.5 mm or even 0.1 mm. The preferred sheet thickness depends on functional requirements and the material selection for the sheet 51F. It is noted that the energy absorber 22F can still have the straps between the crush boxes 22F, (see straps 32 in FIG. 1) where the straps engage the recesses/channels (35) in the face of the beam 21F, but the straps are not shown in FIG. 11 to better show the present invention of sheets 22F and 51F.

It is contemplated that the sheet 51F will maintain its shape and function as follows when the bumper system 20F is impacted. During the initial phase of impact, the crush boxes 23F on sheet 22F affected by the impact begin to collapse, causing air to pressurize within the cavities 52F. As pressure increases, the air begins to escape through vent holes 54F. As the front wall 29F of the sheet 22F reaches a front surface of the pillow-shaped regions 53F, the sides of the pillow-shaped regions 53F have expanded and engage and support the walls of the crush boxes on sheet 22F. Upon further crushing, the sheets 22F and 51F collapse together. Notably, during this later phase of collapse, the walls of the sheets 22F and 51F support each other and increase an overall strength of the crush boxes 23F. Optimally, the sheets 22F and 51F are made from material having a memory, so that they recover their shape after impact.

Figure 12A:
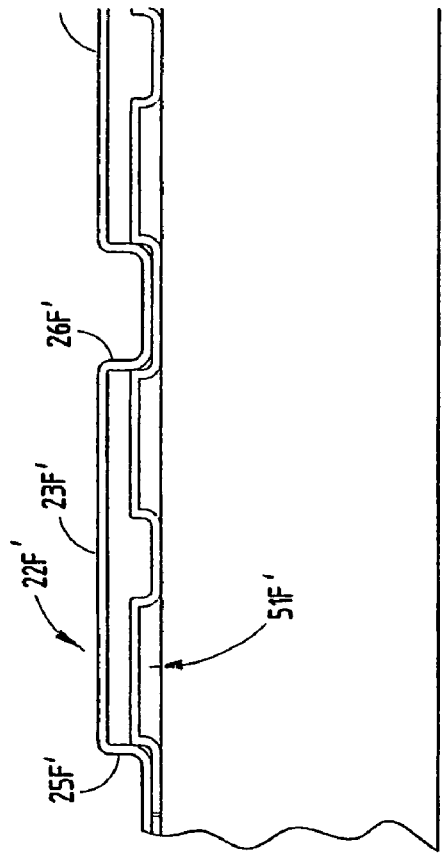
FIG. 12A is a cross-section taken along line XIIA-XIIA in FIG. 12.
Figure 11:
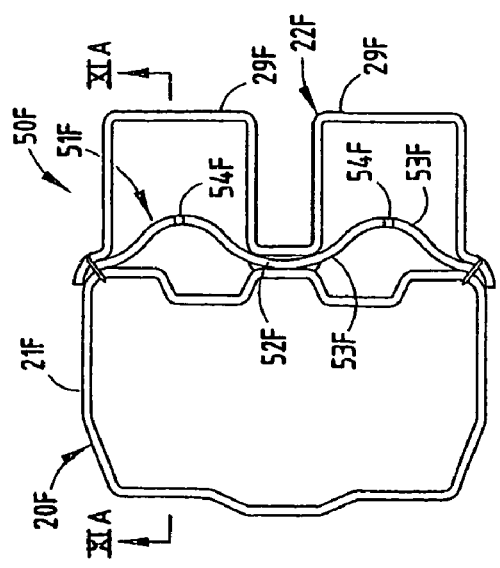
FIG. 11 is a cross sectional view of a third modified bumper system similar to FIG. 10, but including a double-layer thermoformed energy absorber incorporating an air-cushioning feature.
Figure 12:
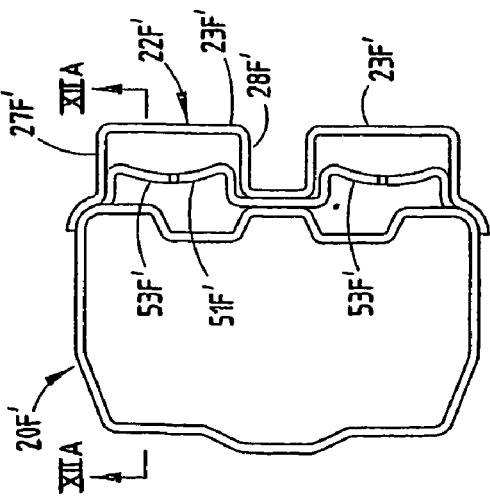
FIG. 12 is a cross-sectional view of a fourth modified bumper system similar to FIG. 11, but having a modified energy absorber.

Energy absorber 22F' (FIGS. 12-12A) is similar to FIG. 11, but the pillow-shaped regions 53F' are box-shaped or trapezoidal-shaped to fit into and match a bottom half of the sidewalls (25F'-28F') of the crush boxes 23F' on the sheet 22F'. Thus, the walls of sheet 51F' engage and support and reinforce the walls 25F'-28F' of the energy absorber 22F' during a final phase of a crushing impact.

A variety of different shapes and arrangements are contemplated for the concept of trapping air within and between thermoformed sheets. Not only can the material and thicknesses of the two sheets be varied, but also the shapes of the crush boxes, the shapes of the pillow-shaped areas, and the shapes, size and number of vent holes. It is also contemplated that different fillers can be put into the cavities, other than air. However, the light weight and low cost of air is difficult to match while still maintaining a competitive, low weight system.

FIG. 13 illustrates a bumper system 20G with a beam 21G and a thermoformed energy absorber 22G where the sidewalls 26G-28G include planar sections 58G, 59G and 60G connected by offsets 61G and 62G. A front wall 29G closes a front of each crush box 23G. The offsets 61G-62G cause the planar sections 58G-60G to telescope together in stages and in a predictable energy-absorbing manner, as illustrated in FIGS. 13-16. As illustrated, the sections 58G and 59G first telescope together (FIG. 14) and then the sections 59G and 60G telescope together. Thereafter, the entire thermoformed energy absorber 22G collapses to an ultra-thin state where it takes up very little thickness. The thinness of the collapsed system is considered to be an important property of the energy absorbers 22-22G. Since the sheet that the thermoformed energy absorbers are made from is relatively thin, its collapsed state is virtually only about double or maybe triple a thickness of the original sheet thickness. Thus, it takes "full advantage" of the limited space that it occupies, by both filling the space for maximum energy absorption and by providing a maximum stroke for absorbing that energy upon impact.

FIG. 17 illustrates another bumper system 20H having a beam 21H and a thermoformed energy absorber 50H similar to energy absorber 22G, but incorporating an air-trapping sheet 51H similar to the sheet 51F (FIGS. 11-12), specifically, when impacted. The sheet 22H is collapsed down to the level of sheet 51H, with entrapped air being expelled through vent hole 54H. Then, the sheets 22H and 51H collapse together (FIGS. 18-20), providing an increased rate of energy absorption.

Figure 21:
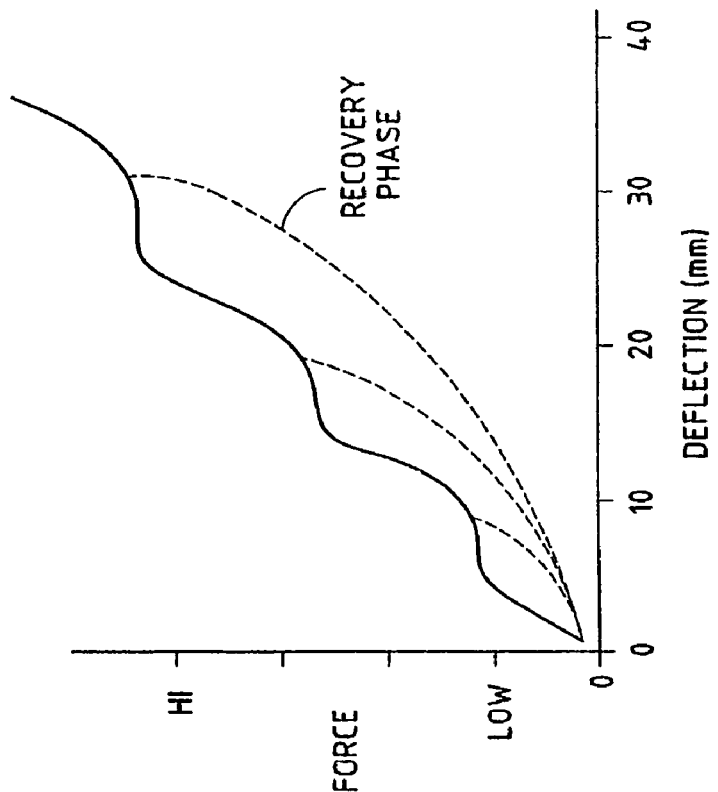
FIG. 21 is a graph showing a force vs deflection curve showing a stepped increase in force and energy absorption over distance of crush, including showing recovery of the energy absorber after release of the impacting body.

FIG. 21 shows force deflection curve of the three-step collapse of energy absorber 22G. A similar stepped energy absorption graph will occur with energy absorber 50H, although the steps will be at different heights and will be affected by the energy dissipated by the escaping trapped air.

Figure 22A:
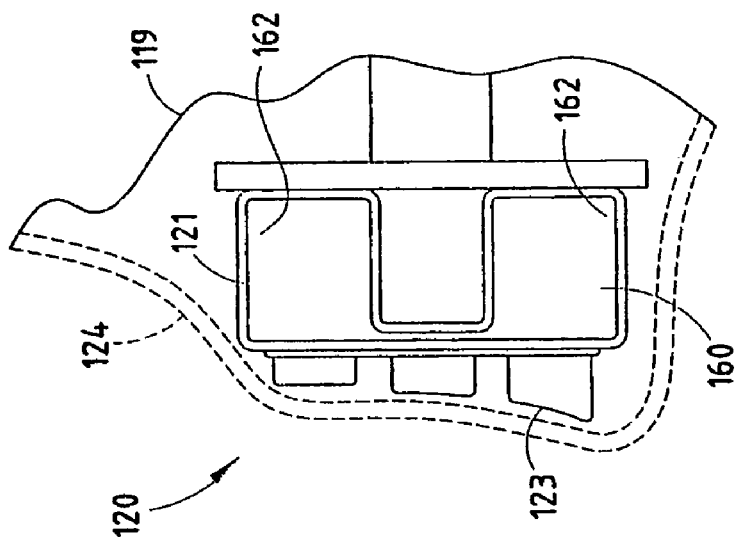
FIGS. 22-22A are cross-sectional views showing a front bumper system incorporating a thermoformed energy absorber of the present invention.
Figure 22:
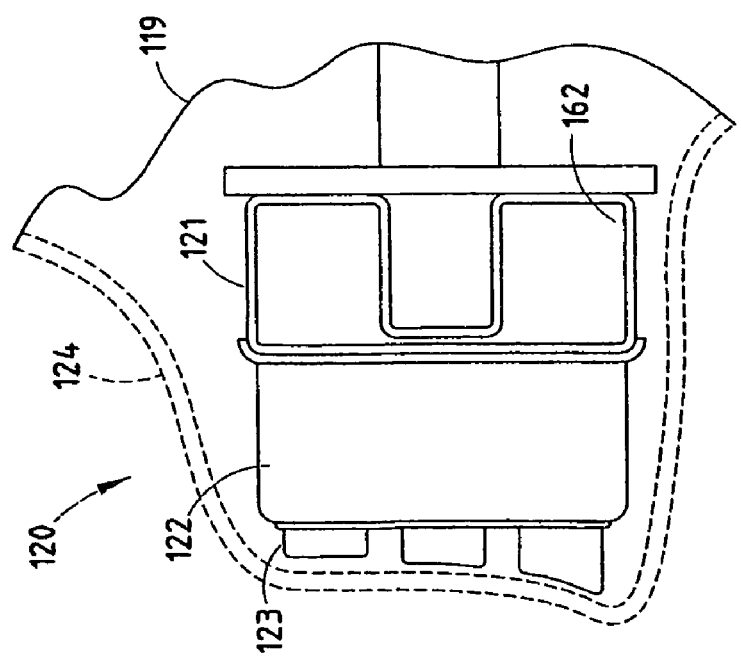

The illustrated arrangement includes a front end 119 (FIG. 22) of a vehicle having a bumper system 120 comprising a reinforcement beam 121, a primary energy absorber 122, and a thermoformed secondary energy absorber subassembly 123, all covered by a fascia 124. The thermoformed energy absorber subassembly 123 provides low-cost supplemental energy absorption to the bumper system, and is very useful when fine-tuning the bumper system for particular model vehicles. This potentially lets the same bumper system be used on different vehicles, but with the addition of the thermoformed absorber subassembly 123 for the "extra" energy absorbing capability required for that particular vehicle. Also, the thermoformed absorber subassembly 123 can be made relatively thin, such as 30 mm to 20 mm or less, or can be made tapered from end to end, such that the thermoformed absorber subassembly 123 can be used in small "empty" areas previously wasted and not used to absorb energy. Also, the thermoformed absorber subassembly 123 can be used as a fascia support component to support fascia having different appearance surfaces and contours, while still allowing use of the same bumper beam and primary energy absorber underneath. Notably, the thermoformed absorber subassembly 123 can potentially be used directly on the reinforcement beam 121 (FIG. 22A) depending upon whatever amount of energy absorption and fascia support is desired. Also, the systems of FIGS. 22 and 22A can be used on front or rear ends of vehicles, and in other applications requiring energy absorption upon impact.

As noted above, it is envisioned that a variety of different shapes, arrangements, and configurations can be constructed using the present concepts. Accordingly, although every single possible combination is not explicitly described herein, all such combinations and variations are intended to be covered by the present description, as may be reasonably understood from this description. Keeping this in mind, the following materials are organized to describe several different single thermoformed sheets; and then to describe two inter-engaging sheets with energy-absorbing crush boxes that interfit and interact upon impact; and to describe two sheets bonded together to define air-trapping crush boxes. By the different arrangements, a wide variety of different force-versus-deflection curves can be achieved, including stepped energy absorption curves, and energy absorption curves where substantial energy is absorbed upon impact.

Figure 23:
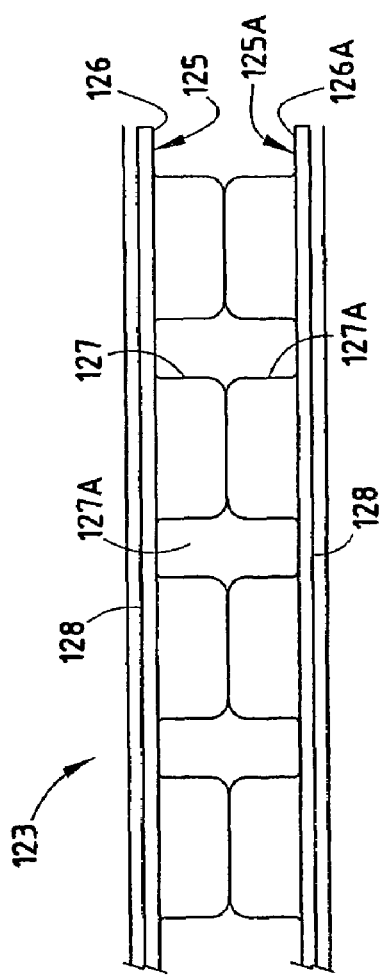
FIG. 23 is a side view of the thermoformed energy absorber of FIG. 22.
Figure 24A:
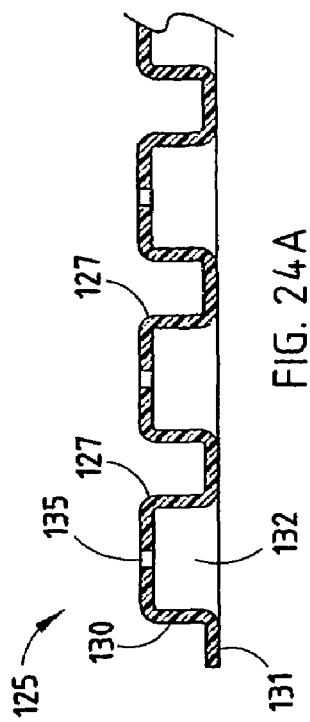
FIG. 24A is a cross section taken along the line IIIA-IIIA in FIG. 24.
Figure 24:
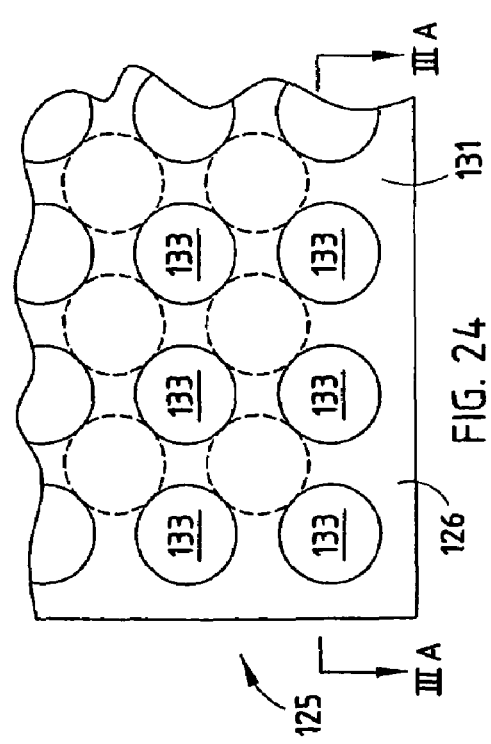
FIG. 24 is a plan view of one polymeric sheet from the energy absorber of FIG. 23, the sheet including a pattern of thermoformed crush boxes.

The energy absorber subassembly 123 (FIG. 23) includes two sheets 125 and 125A of thermoformed polymeric material, each sheet defining a base wall 126 and 126A, (see also FIGS. 24-25) respectively, with a plurality of crush boxes 127 and/or 127A thermoformed therein, and further includes a pair of backing sheets 128 attached to a back of the sheets 125 and 125A. The sheets 125 and 125A will initially be described, then their combination with the backing sheets 128. Thereafter, several variations of sheets 125 and 125A will be described. The variations of sheets 125 will be described by using the letters "A", "B", etc. for similar and/or identical features and aspects.

Each crush box 127 of sheet 125 (FIGS. 24 and 24A) includes a sidewall 130 thermoformed from marginal material 131 in the base wall 126. The thermoformed material forms an opening 132 into a center of the crush box 127, and a floor flange 133 spaced from the sidewall 130 and closing a remote end of the crush box 127. Notably, it is known in the art of thermoforming processes to include a radius at the corner formed by the sidewall 130 and floor flange 133 (and also to include a radius at the corner formed by the sidewall 130 and the base wall 126) in order to avoid over-stretching and weakening and/or tearing the polymeric sheet material during the thermoforming process. It is contemplated that the sidewall 130 may be any variety of different shapes, including cylindrical, frustoconical, rectangular, oval, obround, pyramid, "X" shaped, "I" shaped, or any other structural shape that may be desired. The floor flanges 133 in the illustrated energy absorber sheet 125 are all cup-shaped and are the same height and size. The illustrated arrangement of the crush boxes 127 on the sheet 125 forms a rectangular array and looks much like a cupcake baking pan. It is contemplated that other patterns and crush box shapes (such as flat-sided pyramids) are also possible. An orifice or aperture 135 may be included on the top or side of each crush box 127, if desired, for air flow or for tuning to provide an optimal crush strength. Also, sheet thickness and material can be changed to tune the energy absorber to have a desired force-deflection curve and impact energy absorption.

The energy absorber sheet 125A (FIGS. 25-26) includes a similar array of crush boxes 127A that identically match the pattern and size of the crush boxes 127 on sheet 125, and further includes interspersed within the array a second pattern of taller crush boxes 127A'. The illustrated crush boxes 127A' are about double the height of the crush boxes 127A, and are shaped and positioned to fit between the crush boxes 127. By this arrangement, a top of the crush boxes 127A' engage the base wall 126 of the sheet 125. Also, the shorter crush boxes 127A engage ends of the crush boxes 127. (See FIG. 28.) As illustrated in FIG. 28, the two energy absorbers 123 and 123A can be arranged with their crush boxes 126 interfitting, such that their sidewalls 130 and 130A engage and support each other. (See the dashed lines in FIG. 24, which illustrates crush boxes on a mating sheet that interfit with and support the crush boxes 126 on the illustrated sheet.) Notably, any one or more of the crush boxes 127, 127A, 127A' can be made shorter or longer, which would result in a stepped force-versus-displacement curve. Thus, a different level of energy absorption is provided depending upon a length of the impact stroke experienced. This is a very useful property, and allows bumper systems to be tuned to match particular functional requirements.

A backing sheet 128 (FIG. 27) is (optionally) attached to a rear surface of the marginal material 131 around each crush box 127 on the sheet 125, covering the open side of the crush boxes 127. This traps air within the cavities 132 of the crush boxes 127, forming an air cushion upon impact. An orifice 135 is formed in the backing sheet 128 (or in the sidewall) to allow air to escape in a controlled manner upon impact, so that the crush boxes 127 do not explode unless there is a severe impact. The orifice 135 can be made any size desired, and multiple orifices can be used if desired. Also, it is contemplated that channels 132' (FIG. 27) can be formed in the backing sheet 128 to communicate escaping air from one crush box 127 to an adjacent crush box 127. This distributes stress as well as provides a "fluid" air cushion. Notably, the channels can be sized to control a speed of airflow, as well as routing of airflow.

The sheets 125, 125A and 128 can be any material or thickness. In the illustrated arrangement of FIG. 23, it is contemplated that the sheets 125 and 125A will have enough strength and wall thickness to provide good energy absorption upon collapse of their sidewalls 130 and 130A, such as about 1 mm to 4 mm thickness, or more preferably about 2 mm to 2.5 mm thickness, and will be an impact absorbing material that can be readily thermoformed or vacuum formed. However, the sheet 125 and 125A could be injection-molded or otherwise formed to have thicker or thinner walls, if desired. It is contemplated that the illustrated sheets 125 and 125A will have a total thickness dimension of about 20 mm to 30 mm, but their total thickness can of course be varied as desired. It is further contemplated that the backing sheet 128 and 128A will have a much thinner wall, such as less than 1 mm, and more preferably less than about 0.5 nm, and will be a semi-stretchable and bendable material. Since the backing sheet 128 is positioned against the face of a bumper beam 121, or against a face of a primary energy absorber 122, (or against another backing sheet 128 when multiple subassemblies 123 are layered together), the backing sheet 128 does not need to be 2 mm or thicker . . . though it could be, if desired. The illustrated sidewall 130 extends at about 90° to the base wall 126, but in reality, a small draft angle (such as about 1°) is included to facilitate the thermoforming process. The sidewalls 130 can include larger angles, but it is preferable that the sidewall 130 not be angled more than 45°. It is also contemplated that one (or more) of the sheets 125, 125A, 128 can include laterally-extending flanges and hooks or friction pads that extend rearward onto top and bottom surfaces of the beam 121 (FIG. 22A) to frictionally engage and retain the subassembly 123 onto a beam 121 or primary energy absorber. 122 (FIG. 22) or to the fascia 124, if desired. Also, a height of the crush boxes 127 can be varied to achieve a tapered or aerodynamic shape to better match a particular contour, such as a swept bumper face.

Sheets 125B-125H can be interchanged with sheets 125 or 125A. Identical or similar features are identified with the same numbers to simplify the discussion.

The sheet 125B (FIG. 29) has doughnut-shaped crush boxes 127B with sidewalls 130B, but has a modified floor flange 133B, where a center section 140B of the floor flange 133B is reversely thermoformed to position its center section 140B approximately co-planar with the base wall 126B. An inner sidewall 141B is formed that extends generally parallel the outer sidewall 130B. It is also contemplated that the center section 140B could be only partially deformed, such that it would not be co-planar with base wall 126B . . . in which case the sheet 125B would provide a stepped energy absorption (force-versus-deflection curve).

Figure 31:
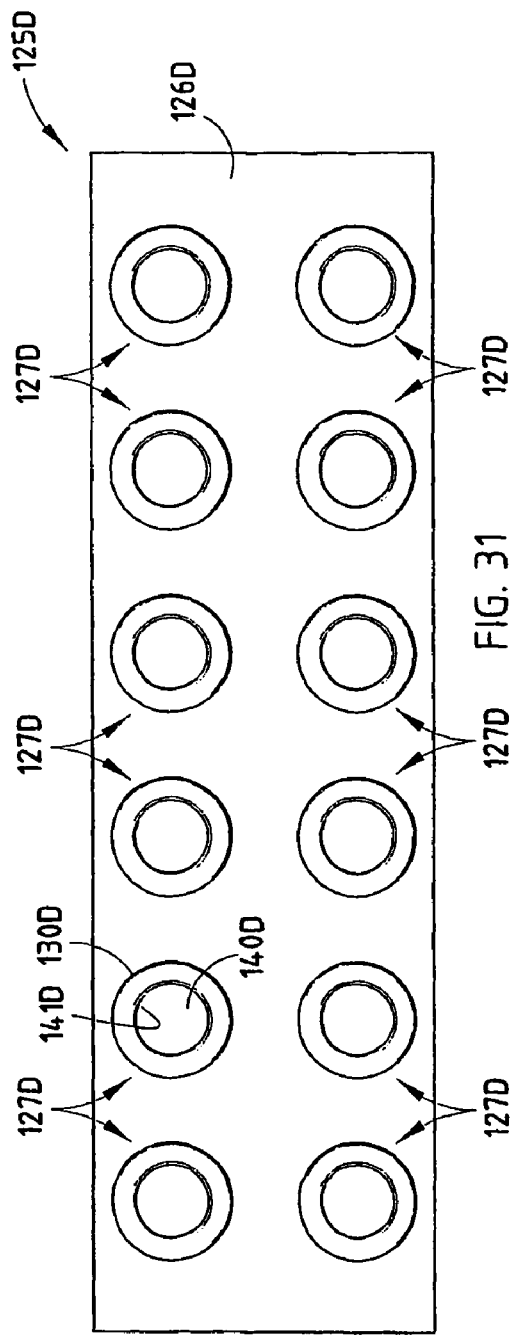
Figure 32:
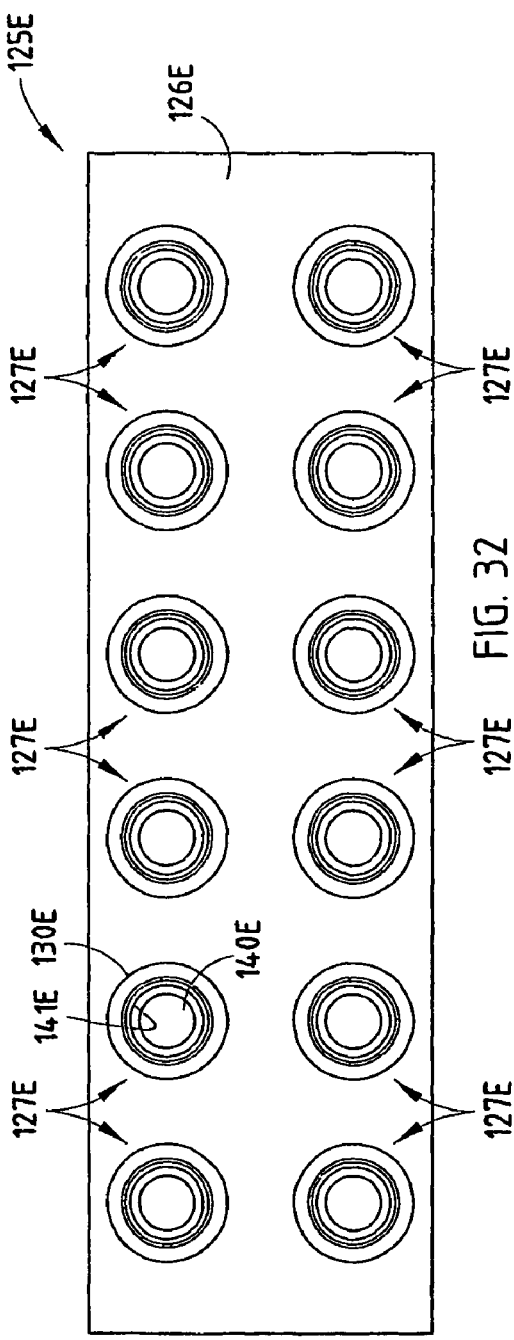
Figure 33A:
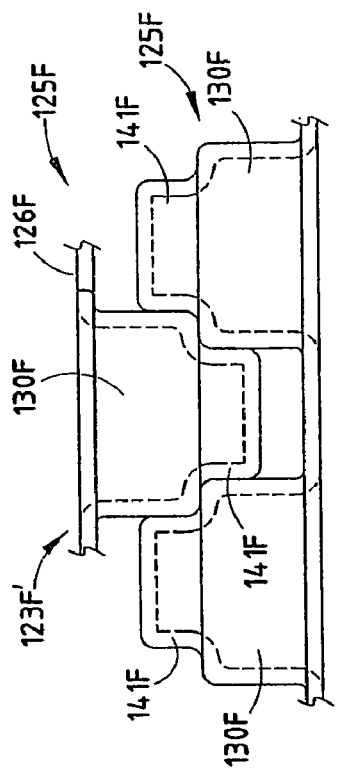
FIG. 33A is a cross sectional view of another modified energy absorber, including a laminated assembly of two sheets of FIG. 33, with opposing interfitting thermoformed crush boxes and two backing sheets providing trapped air in the crush boxes.
Figure 35:
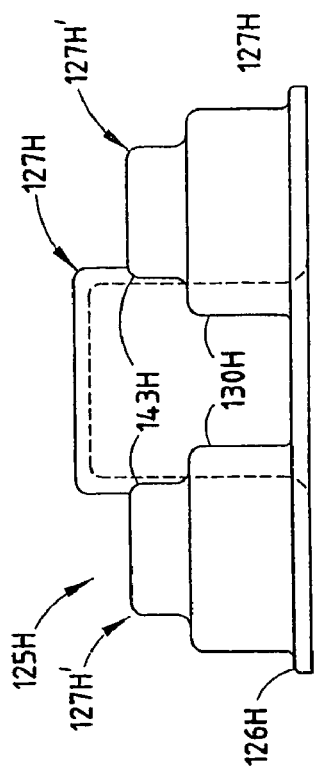
Figure 33:
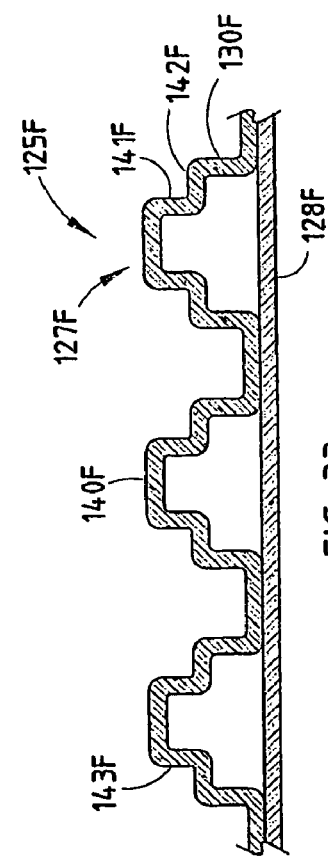
Figure 34:
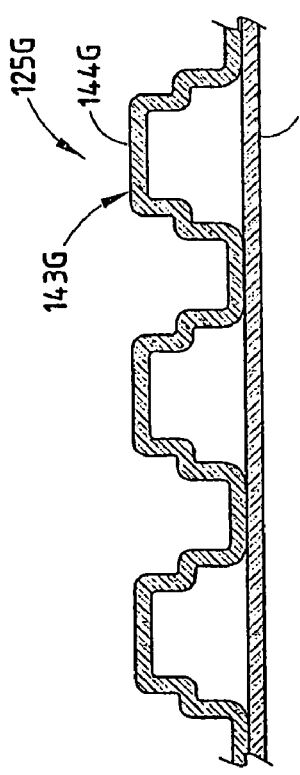

Sheet 125C (FIG. 30) illustrates a circumstance where the crush boxes 127C are formed from a base wall 126C and have the inner and outer sidewalls 141C and 130C positioned relatively close together. Sheet 125D (FIG. 31) is similar to sheet 125C, but the inner and outer sidewalls 141D and 130D of the crush boxes 127D are positioned relatively farther apart. Sheet 125E (FIG. 32) illustrates a circumstance where the center section 140E is only partially recessed, and is not recessed to be co-planar with the base wall 126E. Sheet 125F (FIG. 33) is similar to sheet 125E, but in sheet 125F, the area 142F between the inner and outer sidewalls 141F and 130F is spaced halfway from base wall 126F, and a center region or end 140F of the center section is thermoformed to be spaced farther away from the base wall 126F than the area 142F. Thus, a protruding tip 143F is formed by center region 140F and inner sidewall 141F. The subassembly 123F' (FIG. 33A) includes a pair of sheets 125F, with the outer sidewalls 130F on one sheet engaging and supporting the inner sidewalls 141F on the other sheet 125F. Sheet 125G (FIG. 34) is similar to sheet 125F, but in sheet 125G, its tip 143G has a much wider end 144G.

Figure 36:
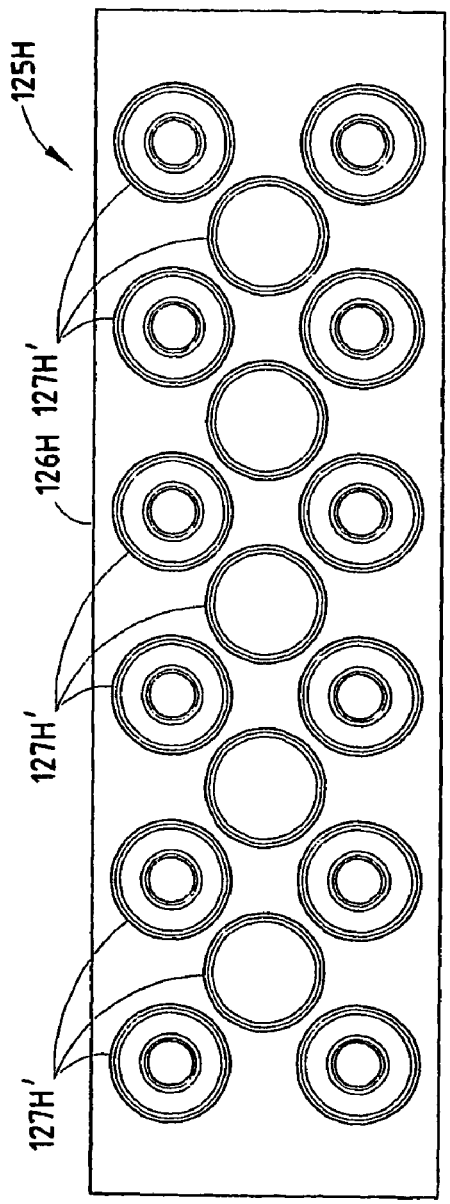
Figure 37:
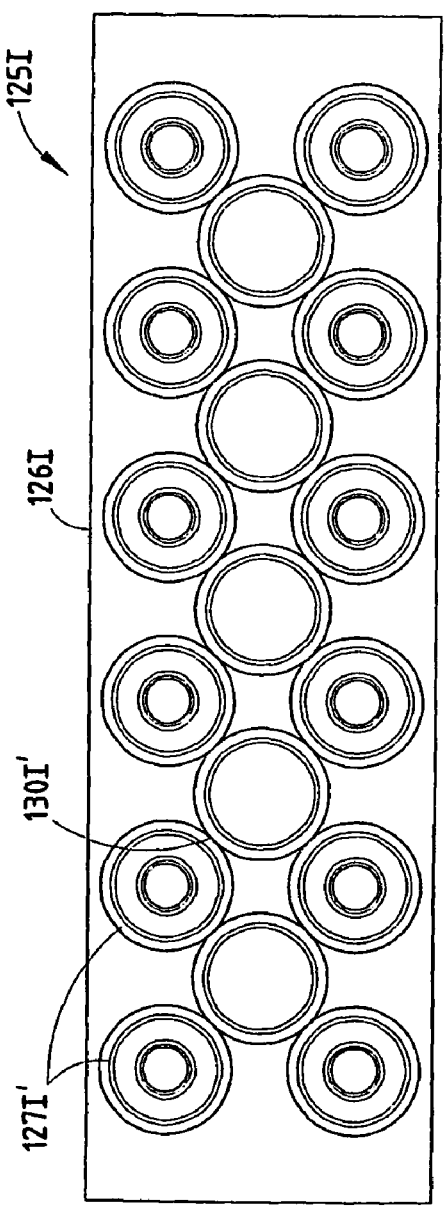

Sheet 125H (FIG. 36) illustrates a condition where two different shaped crush boxes 127H and 127H' are formed in the base wall 126H. The first crush box 127H is cylindrically shaped, and extends to a first height. The second crush box 127H' has a shorter cylindrical shape and includes a protruding tip 143H that extends to a height shorter than the crush box 127H. Thus, the sheet 125H will tend to produce a three-stepped or three-level crush curve (force-versus-deflection curve), each level increasing in strength over the previous level. In sheet 125H, the crush boxes 127H and 127H' have outer sidewalls 130H that are spaced apart. However, it is contemplated that a sheet 125I (FIG. 37) can be constructed where the sidewalls 130I support each other at location 130I', as formed on a single sheet without the need for a second sheet.

Figure 38:
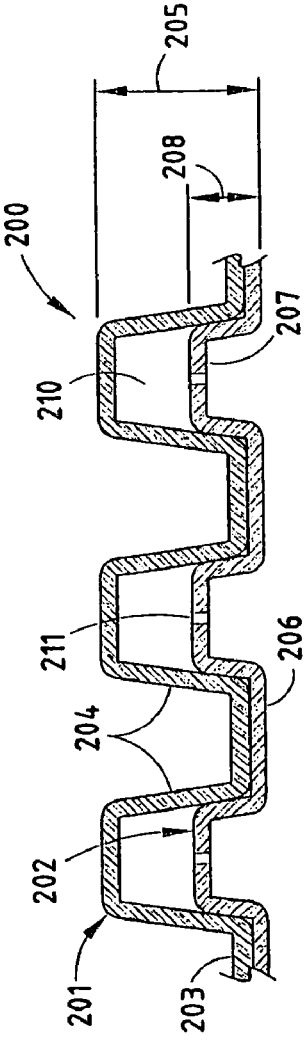
FIG. 38 is a cross-sectional view of another modified energy absorber, including first and second thermoformed sheets with crush boxes thermally vacuum formed therein and located to interfit and trap air therebetween.

FIG. 38 shows yet an additional energy absorber 200 where first and second sheets 201 and 202 are each thermoformed to have the shape somewhat like a cupcake pan. Specifically, sheet 201 has a base wall 203 with tower-shaped, pyramid-like projections 204 forming crush boxes of a height 205, and sheet 202 has a base wall 206, with tower-shaped projections 207 forming crush boxes of a lower height 208. Several (or all) of the projections 207 snap or friction-fit into projections 204 with a LEGO™-like engagement to form air cushioning pockets 210. An orifice or aperture 211 can be formed in one of the sheets 201 or 202 to allow air to escape upon impact. Alternatively, the air can escape at corners of the projections. By this arrangement, the energy absorber provides a stepped energy absorption and is able to recover after release of the impacting object. Notably, the side walls of the projections 204 and 207 are inclined both as a draft angle to permit thermoforming, but also so that they further engage during impact to more-tightly seal the air trapped therein. Further, the walls support each other to provide additional support to prevent premature collapse upon impact. This inter-wall support extends only part of the height 205 (i.e., due to the short height 208), such that it results in a stepped energy absorption upon impact.

To summarize, a thermoformed energy absorber can be made from a single sheet, with crush boxes being formed by vacuum forming, or other thermoforming techniques. It is contemplated that the crush boxes can be any shape, including a "cupcake pan" pattern, or other more complicated cup or box shapes. It is contemplated that the crush boxes will be made of material that will recover after impact, although that is not required. The energy absorbers can be made from other processing methods other than thermoforming, such as injection-molding. The energy absorber can be made to provide a single step energy absorption curve (force-versus-deflection curve), or can provide a stepped energy absorption. The sheet can be made to bend to match a swept curvature across a face of reinforcement (metal) beam (or primary energy absorber), and can be configured with flanges such as hooked flanges 160 (FIG. 22A) that engage holes or recesses 162 in the beam 121 or in the primary energy absorber 122 to snap-attach in place.

The energy absorber sheet can be modified by adding a backing sheet to entrap air, such that the sheet provides an air cushion upon impact. Alternatively, the backing sheet can be eliminated by attaching the sheet directly to a beam (or to a fascia) with the crush boxes being held in a sealed arrangement. Orifices and/or channels can be provided to control airflow out of crush boxes during impact, and to communicate the exhausting air to other crush boxes.

Two opposing sheets with inter-engaging and inter-supporting crush boxes can be used as a laminated subassembly. The crush boxes may be identical in shape, or different but matingly shaped. Additional layers of sheets can be added, in addition to just two sheets. The sheets will preferably be made of a material that recovers after impact, and yet that is easily formed.

In the foregoing description, it will be readily appreciated by persons skilled in the art that modifications may be made to the invention without departing from the concepts disclosed herein. Such modifications are to be considered as included in the following claims, unless these claims by their language expressly state otherwise.

The invention claimed is:

1. A method of making a bumper system for a vehicle, comprising steps of:
providing a reinforcement beam adapted for attachment to a vehicle frame;
thermoforming a sheet of material to form a thermoformed energy absorber configured to be supported on a face of the reinforcement beam, the energy absorber having a base flange and a plurality of thermoformed longitudinally-elongated crush boxes that extend generally perpendicularly from the base flange in a fore/aft direction parallel a direction of expected impact; the crush boxes each having opposing side walls and orthogonally-related end walls and a side-wall-supported front wall with the crush boxes each being spaced apart from each other along the base flange; the crush boxes each defining a separate rearwardly-facing opening; the energy absorber defining a forward-facing surface and a rearward-facing surface, each being open and unobstructed in a linear direction parallel the fore/aft direction and not having undercut surfaces, the step of thermoforming including passing a portion of mold tooling in a forming direction parallel the fore/aft direction through the base flange linearly into the rearwardly-facing openings defined by the crush boxes and stretching the opposing side walls to have a thickness dimension less than a thickness of the front walls and of the base flange due to the thermoforming process; and
assembling the energy absorber to the beam including abutting the thermoformed energy absorber against the beam.

2. The method defined in claim 1, wherein the step of thermoforming includes forming crush boxes having at least one laterally-defined concavity in one of the side walls such that the crush boxes, in front view, define one of an "H" shape, a "T" shape, an "X" shape, and a "C" shape.

3. The method defined in claim 1, wherein the step of thermoforming including forming crush boxes with at least one of the side walls having a wavy shape with undulations that extend parallel the fore/aft direction.

4. The method defined in claim 1, wherein the step of thermoforming includes, starting at a center of the energy absorber, forming inboard ones of the crush boxes to have a different height dimension in the fore-aft direction than outboard ones of the crush boxes.

5. The method defined in claim 1, wherein the step of thermoforming includes forming at least one side wall to include a front portion defining a first plane, a second portion defining a second plane parallel the first plane, and an offset connecting portion that, when the bumper system is impacted, causes the first and second portions to telescope overlappingly onto each other.

6. The method defined in claim 1, including providing a second sheet of material and including bonding the second sheet to the first-mentioned sheet to form air-filled air-cushioning pockets within the crush boxes.

7. The method defined in claim 6, wherein the second sheet of material includes vents for controlling flow of air exiting the air-cushioning pockets during an impact.

8. The method defined in claim 1, wherein the face of the reinforcement beam includes one of a depression feature and a protrusion feature, and the base flange includes the other of the depression feature and protrusion feature, and wherein the step of abutting includes engaging the one feature into the other feature to retain the energy absorber on the face of the reinforcement beam upon an impact against the bumper system.

9. The method defined in claim 8, wherein the depression feature is a channel, and the protrusion feature is a ridge.

10. The method defined in claim 1, including a step of forming a second thermoformed energy absorber with second crush boxes formed to mate against the first-mentioned crush boxes.

11. The method defined in claim 1, wherein the beam is longitudinally swept, and wherein the thermoformed energy absorber is flexible, and including bending the energy absorber to flexibly deformingly engage a face of the beam.

12. A method of forming a bumper system comprising steps of:
providing a beam;
thermoforming an energy absorber from a sheet of material to have a base flange and thermoformed crush boxes formed therein, the crush boxes being spaced apart and each having side walls, end walls and a face wall to form a box shape, the step of thermoforming including forming at least one of the side walls to include a front portion defining a first plane, a second portion defining a second plane parallel the first plane, and an offset connecting portion that, when the bumper system is impacted, cause the first and second portions to telescope overlapping onto each other in a predictable manner.

13. A method of forming a bumper system comprising steps of:
providing a bumper beam having a face and at least one elongated recess formed in the face; and
thermoforming an energy absorber from a sheet of material to have a base flange and crush boxes formed in the energy absorber in a direction perpendicular to the base flange, the step of thermoforming including forming at least one thermoformed ridge extending from the base flange into engagement with the recess to retain the energy absorber on the face during a vehicle crash.

14. The method defined in claim 13, wherein the recess comprises a longitudinally-extending channel formed in a face of the beam.

15. A method of forming a bumper system comprising steps of:
providing a metal tubular bumper beam having a face;
providing a first polymeric energy absorber having energy-absorbing blocks selected from one or both of hollow crush boxes and foam blocks; and
thermoforming a second polymeric energy absorber from a sheet of material, the second polymeric energy absorber being configured to cover a substantial portion of a front of the first polymeric energy absorber, the second polymeric energy absorber including a base flange engaging the first polymeric energy absorber and including at least one crush box formed therein.

16. The method defined in claim 15, wherein the first and second polymeric energy absorbers include mating surfaces that frictionally and detentingly engage to retain the energy absorbers together.

17. A method of making a vehicle bumper system comprising steps of:
providing a reinforcement beam having a face and being adapted for attachment to a vehicle frame;
providing an energy absorber abutting the face, the energy absorber including a thermoformed component formed from a sheet of material; and
providing a fascia;
covering the beam and the energy absorber using the fascia, with the thermoformed component having a base sheet adjacent the face and a plurality of crush boxes extending forwardly from the base sheet into engagement with the fascia; the crush boxes each having opposing side walls and a front wall that define orthogonally-related planes, and also having top and bottom walls that are undulating in a longitudinal direction with alternating convex and concave regions; the crush boxes being open on at least one side to facilitate thermoforming the thermoformed component, the crush boxes defining shapes selected from a group of shapes where at least one of the side walls defines a concavity.

18. The method defined in claim 17, wherein the at least one side wall has a shape consisting of one of the following shapes: I, H, C, T, and X.

19. The vehicle bumper system defined in claim 18, wherein the side walls of the crush boxes include at least two different ones of the shapes I, H, C, T, and X.

20. A method of forming a vehicle bumper system comprising steps of:
providing a reinforcement beam having a face and being adapted for attachment to a vehicle frame, the reinforcement beam having a channel formed into the face;
thermoforming an energy absorber from a sheet of material, the thermoformed energy absorber being configured to abuttingly engage the face; and
assembling a fascia over the beam and the energy absorber, with the thermoformed energy absorber having a base sheet abutting the face and having a plurality of crush boxes extending forwardly from the base sheet into engagement with the fascia; the thermoformed component further having a rearwardly-extending feature formed into the base sheet that extends into the channel in the face of the beam for assisting in retaining the energy absorber on the face during a vehicle crash.

* * * * *